(12) United States Patent
Dingman et al.

(10) Patent No.: US 7,736,686 B2
(45) Date of Patent: Jun. 15, 2010

(54) MEAT EMULSION PRODUCTS AND METHODS OF MAKING SAME

(75) Inventors: Steven E. Dingman, Edwardsville, IL (US); Kevin J. Cully, Chesterfield, MO (US); Michael G. Rayner, St. Joseph, MO (US); Stephen G. May, Wildwood, MO (US); Sheri L. Smithey, Centertown, MO (US)

(73) Assignee: Nestec S.A., Vevey (CH)

( * ) Notice: Subject to any disclaimer, the term of this patent is extended or adjusted under 35 U.S.C. 154(b) by 815 days.

(21) Appl. No.: 11/612,989

(22) Filed: Dec. 19, 2006

(65) Prior Publication Data

US 2007/0148323 A1    Jun. 28, 2007

Related U.S. Application Data

(63) Continuation-in-part of application No. 10/149,545, filed as application No. PCT/EP00/11238 on Nov. 8, 2000, now abandoned.

(51) Int. Cl.
*A23J 1/02* (2006.01)

(52) U.S. Cl. .................. 426/646; 426/574; 426/513; 426/516; 426/517; 426/518; 426/520

(58) Field of Classification Search .............. 426/646, 426/574, 513, 516, 517, 518, 520
See application file for complete search history.

(56) References Cited

U.S. PATENT DOCUMENTS

| 3,095,255 | A | * | 6/1963 | Smith | 62/512 |
| 4,542,686 | A | * | 9/1985 | Bansal | 99/483 |
| 4,781,939 | A | | 11/1988 | Martin et al. | |
| 6,001,402 | A | * | 12/1999 | Dupont | 426/249 |
| 6,379,738 | B1 | * | 4/2002 | Dingman et al. | 426/646 |
| 6,648,501 | B2 | * | 11/2003 | Huber et al. | 366/301 |
| 2001/0041202 | A1 | * | 11/2001 | Dupont et al. | 426/407 |

\* cited by examiner

*Primary Examiner*—C. Sayala
(74) *Attorney, Agent, or Firm*—K&L Gates LLP (57) ABSTRACT

Meat emulsion products and methods for producing meat emulsion products are presented. Meat emulsion products are produced that have realistic fiber definition. In an embodiment, the meat emulsion products comprise a protein, a fat and a plurality of colors and/or textures. The meat emulsion products further comprise a plurality of linear strands of fiber-like material affording the meat emulsion product a realistic meat-like appearance.

21 Claims, 9 Drawing Sheets

Mix with Gravy, Fill, Seam, Retort

Mix with Gravy, Fill, Seam, Retort

MEAT EMULSION PRODUCTS AND METHODS OF MAKING SAME

PRIORITY CLAIMS

This application is a continuation-in-part of U.S. patent application Ser. No. 10/149,545 filed on Sep. 25, 2002, now abandoned which is a U.S. National Phase of PCT/EP00/11238 filed on Nov. 8, 2000, which claims priority to U.S. patent application Ser. No. 09/441,246 filed on Nov. 16, 1999, now U.S. Pat. No. 6,379,738, the entire disclosures of which are hereby incorporated by reference.

BACKGROUND

The present disclosure relates generally to food products. More specifically, the present disclosure relates to meat emulsion products having a meat-like appearance and texture and methods of making the meat emulsion products.

It is known to produce meat emulsions in the food industry. Meat emulsions are widely used in the production of products such as bologna, frankfurters, and other sausage products. Additionally, such meat emulsion products are used to produce pet foods.

Typically, meat emulsion products are prepared by mixing, chopping, and emulsifying a mixture of raw meat materials such as lean skeletal beef and pork, and meat by-products, with ice, salt, spices, and curing salts in such a manner as to produce an emulsion that contains fine fat particles coated with protein dissolved from meat ingredients. In the case of a sausage product, the resultant meat emulsion is then stuffed into a suitable casing, that serves as a processing mold. The casing is then heated at increasing temperatures, for example 55° C. to 77° C., for extended periods of time, which may vary between 1 to 8 hours or more, depending on the volume of meat emulsion being processed.

The heating of the meat emulsion, causes the protein contained therein to coagulate or to set solid. This thereby entraps the fat particles in the protein matrix thereby forming a firm meat emulsion product. The resultant meat emulsion products are a uniform homogeneous mass which contains no discrete particles of meat and retains the shape of the casing when set.

In order to reduce the cost of certain food products to consumers, in recent years, there has been a demand for meat emulsion products that resemble chunks or pieces of natural meat in appearance, texture, and physical structure. Such products are used as a partial or complete replacement for more expensive natural meat chunks in food products such as stews, pot pies, casseroles, canned foods, and pet food products. Chunky meat products are highly desirable in human foods and pet foods, both for aesthetic quality and consumer appeal. These chunky products provide a more economical product which attempts to simulate natural meat chunks in shape, appearance, and texture. It is highly desirable that these products retain their shape, appearance, and texture when subjected to commercial canning and retorting procedures.

Efforts directed to providing such simulated natural meat chunks have included producing such products from vegetable protein sources using extrusion-expansion techniques. Such products have met with some acceptance in the food industry, but they have been limited primarily to use as meat extenders; products produced using vegetable protein sources in an extrusion-expansion procedure lack the appearance and texture of natural meat and therefore are generally not suitable as fill substitutes for meat.

Similarly, meat extrusion products, based on meat protein, produced by conventional procedures have not been entirely satisfactory. These products are in the form of a uniform, homogeneous mass, and lack the structure, texture, and appearance of natural meat chunks. Therefore, these products are not suitable for use in applications in which the use of simulated meat chunks is desired.

One attempt to improve such meat emulsion products is disclosed in U.S. Pat. No. 4,781,939. This patent discloses processing a meat emulsion under conditions which result in the production of a layered, non-expanded product in the form of chunks or pieces which simulate natural meat chunks in texture, appearance, and consistency. The meat emulsion product is in the form of distinct chunks or pieces having a plurality of juxtaposed, manually separable meat-like layers resembling a chunk of natural meat in appearance, texture, and consistency. The meat emulsion chunks are suitable for use as a partial or complete replacement for more expensive natural meat chunks in both human foods and animal foods. They retain their integrity and shape when subjected to commercial canning and sterilization procedures such as those required in the production of canned, high moisture food products.

Although, the products produced by the methods set forth in U.S. Pat. No. 4,781,939 provide meat emulsion chunks that can be used as a replacement for more expensive natural meat chunks in both human foods and animal foods, such products still do not entirely simulate a meat-like product, and may not have as strong of bite/mouth feel as a real meat chunk. In this regard, such products do not entirely simulate muscle meat which includes a plurality of linear fiber bundles or strands.

SUMMARY

The present disclosure relates to meat emulsion products having a meat-like appearance and texture and methods of making the meat emulsion products. In an embodiment, the present disclosure provides a meat emulsion product comprising a body defined by a plurality of fibrous or fiber-like structures and a plurality of distinct colors. The body can comprise at least about 29% protein by weight and less than about 9% fat by weight.

In an embodiment, the plurality of colors gives the outer surface of the meat emulsion an appearance or pattern such as, for example, swirling, marbling, shading or combinations thereof of different colors.

In an embodiment, the colors are derived from a coloring agent such as, for example, caramel, FD&C certified colors, titanium dioxide, iron oxides, annatto, turmeric, natural colors, artificial colors or combinations thereof.

In an embodiment, the protein can be, for example, poultry, beef, pork, fish and combinations thereof.

In an embodiment, the meat emulsion comprises at least one proteinaceous material.

In an embodiment, the proteinaceous material comprises approximately 25% to about 55% by weight of the product.

In another embodiment, the present disclosure provides a meat emulsion product comprising protein, fat and a plurality of distinct textures. For example, at least one of the textures comprises a plurality of fiber structures integrally formed therewith affording the meat emulsion product a realistic meat-like appearance.

In an embodiment, the meat emulsion product comprises a texturizing ingredient such as, for example, wheat gluten, wheat flour, egg white, sulfur compounds, cystine, gums, soy proteins and combinations thereof.

In an embodiment, the protein comprises approximately 29% to about 31% by weight of the meat emulsion product.

In an embodiment, the fat comprises approximately 4% to about 9% by weight of the meat emulsion product.

In an embodiment, the meat emulsion product comprises approximately 52% to about 56% by weight moisture.

In an alternative embodiment, the present disclosure provides a meat emulsion product comprising a body defined by a plurality of linear strands of fibrous material and a plurality of axial strands of fibrous material that afford the meat emulsion product a realistic meat-like appearance.

In another embodiment, the present disclosure provides a method for producing a meat emulsion product. In this embodiment, the method comprises forming a first meat emulsion comprising a protein, a fat and a first color and forming a second meat emulsion comprising a protein, a fat and a second color. The first meat emulsion is mixed with the second meat emulsion. The meat emulsion is heated, for example, to a temperature of about 100° C. to about 165° C. The mixed meat emulsion is subjected to a pressure of at least about 80 psi. The pressurized meat emulsion is passed through a heat exchanger to lower the temperature of the meat emulsion to form the meat emulsion product.

In an alternative embodiment, the present disclosure provides a method for producing meat emulsion products. In this embodiment, the method comprises forming a meat emulsion comprising a protein, a fat and a first color. The meat emulsion is comminuted and heated, for example, to a temperature of about 100° C. to about 165° C. A second color is added to the meat emulsion and mixed with the meat emulsion. The meat emulsion is subjected to a pressure of at least about 80 psi. The pressurized meat emulsion is passed through a heat exchanger to lower the temperature of the meat emulsion to form the meat emulsion product.

In yet another embodiment, the present disclosure provides a method for producing meat emulsion products. In this embodiment, the method comprises forming a meat emulsion comprising a protein and a fat and comminuting and heating the meat emulsion, for example, to a temperature of about 100° C. to about 165° C. The meat emulsion is subjected to a pressure of at least about 80 psi. The meat emulsion is then subjected to a longitudinal spiraling flow. The meat emulsion is finally discharged to form the meat emulsion product.

In an alternative embodiment, the present disclosure provides a method for producing a meat emulsion product. In this embodiment, the method comprises forming a first meat emulsion comprising a protein, a fat and first texturizing ingredient and forming a second meat emulsion comprising a protein, a fat and a second texturizing ingredient. The first meat emulsion is mixed with the second meat emulsion. The mixed meat emulsion is heated and subjected to a pressure of at least about 80 psi. The pressurized meat emulsion is passed through a heat exchanger to lower the temperature of the meat emulsion to form the meat emulsion product.

In still another embodiment, the present disclosure provides a method for producing meat emulsion products. In this embodiment, the method comprises forming a meat emulsion comprising a protein and a fat and comminuting and heating the meat emulsion, for example, to a temperature of about 100° C. to about 165° C. The meat emulsion is subjected to a pressure of at least about 80 psi and then vented to release moisture from the meat emulsion. The meat emulsion is discharged to form the meat emulsion product.

In an alternative embodiment, the present disclosure provides a method for producing meat emulsion products. In this embodiment, the method comprises forming a first meat emulsion comprising a protein, a fat and a first color and comminuting and heating the meat emulsion, for example, to a temperature of about 100° C. to about 165° C. The meat emulsion is subjected to a pressure of at least about 80 psi and passed through a sintered chamber. The pressurized meat emulsion is discharged to form the meat emulsion product.

An advantage of the present disclosure to provide improved meat emulsion products.

Another advantage of the present disclosure is to provide improved methods for manufacturing meat emulsion products.

Yet another advantage of the present disclosure is to provide a meat emulsion product that simulates muscle meat.

Still another advantage of the present disclosure is to provide a meat emulsion product that has a very realistic, meat-like image.

Another advantage of the present disclosure is to provide a meat emulsion product that has a very realistic meat-like image and retains its integrity and shape when subjected to commercial canning and sterilization procedures such as those required in the production of canned high-moisture food products.

Yet another advantage of the present disclosure is to provide a meat emulsion that can simulate poultry, pork, beef, or other meat.

Additional features and advantages are described herein, and will be apparent from, the following Detailed Description and the Figures.

DETAILED DESCRIPTION

The present disclosure provides improved meat emulsion products as well as methods for manufacturing same. Pursuant to the present disclosure, meat emulsion products are produced that have realistic fiber definition in contrast to meat emulsions produced heretofore. This fiber definition provides a very realistic meat-like image or appearance similar to that of muscle meat. The resultant product also has a stronger bite/mouth feel and is not pasty, mushy or brittle as compared to other meat emulsion products. In a preferred embodiment, the meat emulsion products are designed for canned pet food.

However, it should be noted that the present disclosure can produce meat emulsion for human consumption. The meat emulsion product can simulate any type of meat products including poultry, beef, pork, fish and combinations thereof.

As used herein, the terms "fiber-like," "meat-like" and "kibble-like" to describe the meat emulsion products mean that the meat emulsion products possess, in part, the same or almost the same physical appearance and characteristics as actual fibers, meats and kibbles, respectively, as understood by the skilled artisan. The meat emulsion products are produced that have realistic fiber definition that provides a very realistic meat-like appearance similar to that of muscle meat.

As used herein, the term "distinct" to describe the colors and/or textures of the meat emulsion products mean that the meat emulsion products possess, in part, readily distinguishable or discrete colors and/or textures. The distinct colors and/or distinct textures of the meat emulsion product are clear to the senses (e.g. visual, mouthfeel) of an observer or consumer.

Although the claimed products are, in part, meat emulsions, they possess the same or almost the same characteristics as that of real meat. The resultant products also have a stronger bite/mouth feel and are not pasty, mushy or brittle as compared to other meat emulsion products. In addition, moisture reduction may also be accomplished so that the resultant product pieces, although displaying fibers, have a generally kibble-like appearance.

As set forth in detail below, generally the meat products are produced by emulsifying meat, protein, water, and various ingredients. The emulsion is then run through a high speed emulsion mill wherein the emulsion is rapidly heated to thermally gel it. The heated emulsion is then discharged into a heat exchanger in which it solidifies into a striated meat-like structure.

As is set forth in detail below, pursuant to the present disclosure a meat emulsion product is produced that has improved fiber definition (visible small diameter fibers) that afford the product a very realistic meat-like image. In this regard, the resultant meat emulsion product has fiber bundles or strands that afford the meat emulsion a very realistic muscle meat appearance. It is believed that for a resultant poultry meat emulsion product that the product of the present disclosure has the appearance of tender slow cooked chicken or turkey that was hand-pulled from the bone covered in its own broth/juice. Pursuant to the present disclosure, additionally, a meat emulsion product is produced that has irregular product shape and dimensions, having a stronger bite/mouth feel and is not pasty, mushy or brittle.

Figure 1:
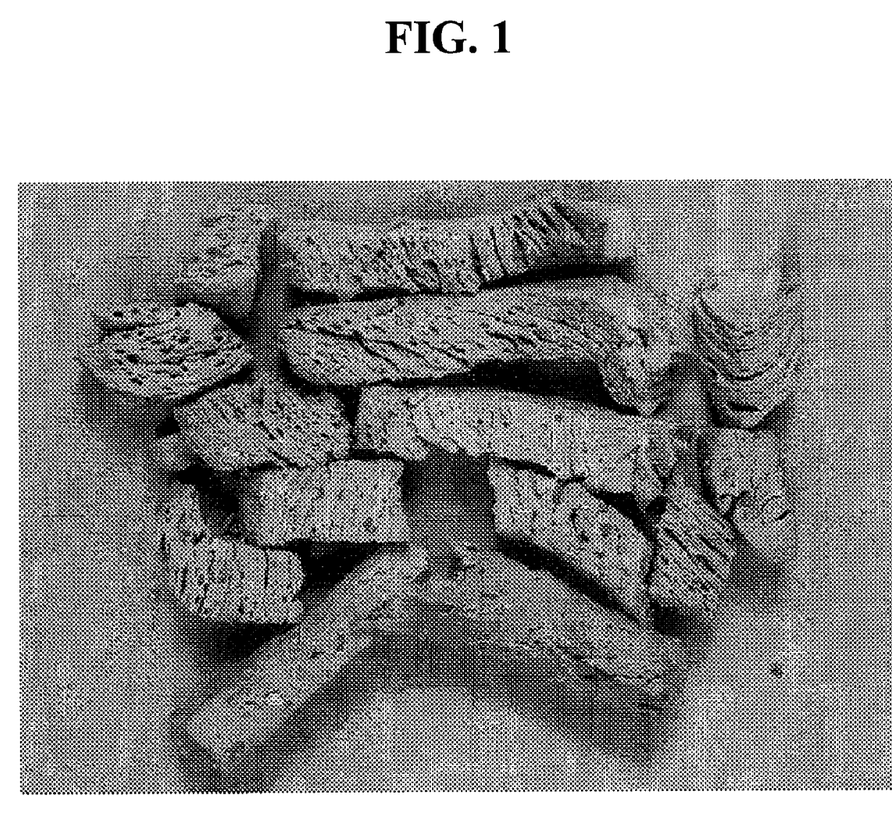
FIG. 1 is photograph of a prior art meat emulsion product.

Referring to the figures, FIG. 1 illustrates a prior art meat emulsion product. As set forth in the photograph, the product does not include any fibers, but rather has a homogeneous like structure.

Figure 2:
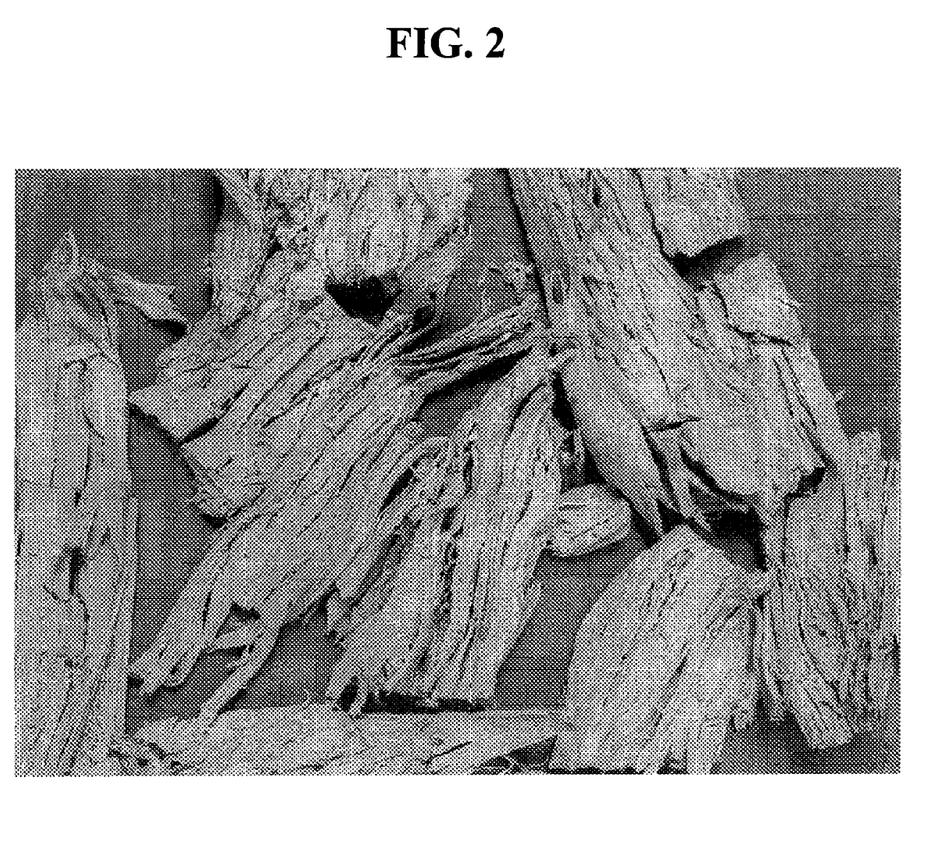
FIG. 2 is a photograph of an embodiment of a meat emulsion product in one embodiment of the present disclosure.

FIG. 2 illustrates a meat emulsion product of the present disclosure. As can be seen in the photograph, the product has a plurality of strands of fibers that are linearly arranged in bundles. This provides a more realistic meat-like product than the meat emulsion of FIG. 1.

Figure 3:
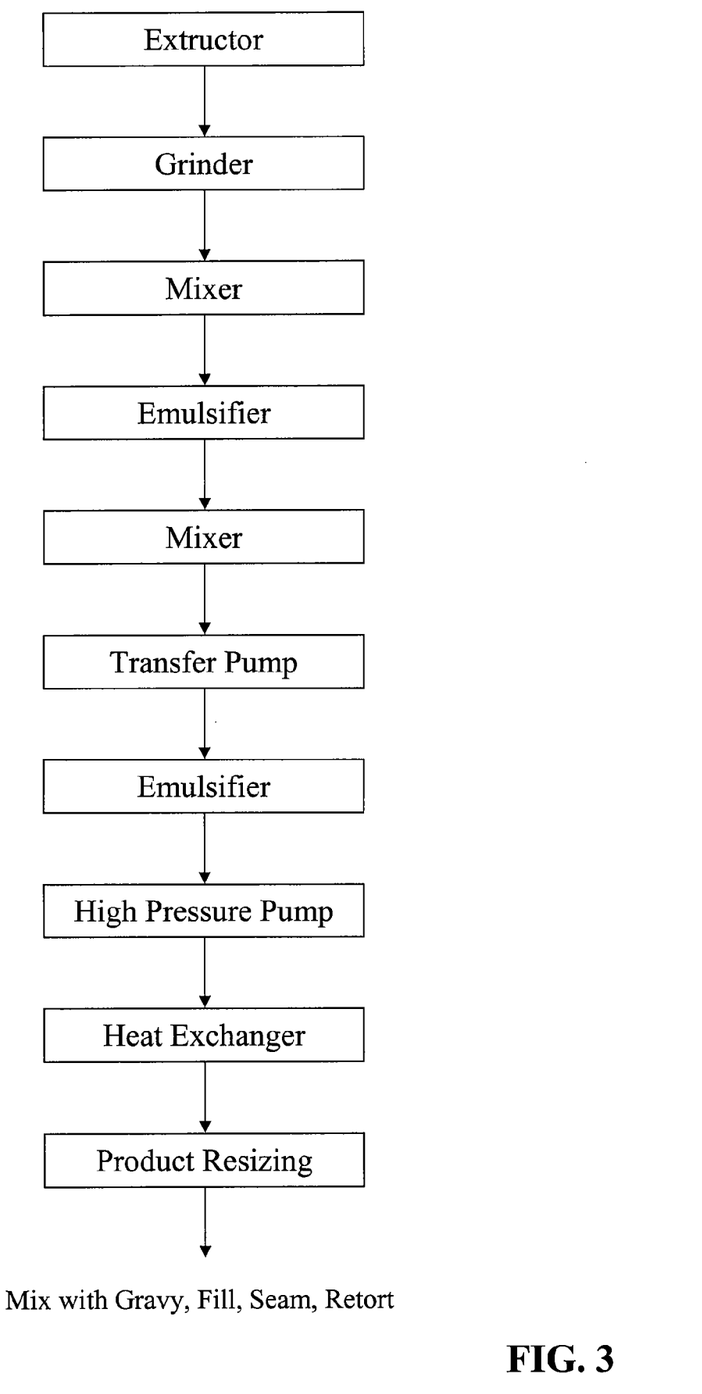
FIG. 3 is a schematic of a process for manufacturing meat emulsion products in an embodiment of the present disclosure.

FIG. 3 illustrates a schematic of the general process for manufacturing meat emulsion products in an embodiment of the present disclosure. In preparing the meat emulsion product in accordance with an embodiment of the present disclosure, a mixture of natural meat materials, including meat from mammals, fish, or fowl and/or meat by-products, having the requisite quality, ingredient cost and palatability, is formulated, ground, and emulsified. For example, the meat material can be emulsified using a high speed blender that reduces the size of the meat materials (along with any added ingredients) via mixing and shearing forces as detailed below.

The meat and/or meat by-products used may be selected from a wide range of components, with the type and amount of meat material used in the formulation depending on a number of considerations such as the intended use of the product, the desired flavor of the product, palatability, cost, availability of ingredients, and the like. Both meat (i.e. skeletal tissue and non-skeletal muscle) from a variety of mammals, fowl, and fish, and/or meat by-products (i.e. the non-rendered clean parts, other than meat, derived from slaughtered mammals, fowl, or fish) may be used as the meat material. Thus, the term meat material as used herein is understood to refer to non-dehydrated meat and/or meat by-products, including frozen materials.

If the product is intended for human consumption, any of the meats and meat by-products used in the production of conventional meat emulsion products may be used in the present disclosure, including meats such as whole-carcass beef and mutton, lean pork trim, beef shanks, veal, beef and pork cheek meat, and meat by-products such as lips, tripe, hearts, and tongues. If the product is intended for use as a pet food product, the meat mix may contain, in addition to the meat materials described above, any of the meat by-products which are approved for use in animal foods, such as mechanically deboned beef, chicken, or fish, beef and pork liver, lungs, kidney, and the like. In an embodiment, the meat material can comprise a combination of 3 to 5 different types of meats/byproducts and be formulated to contain a maximum of about 25%, and preferably below about 13%, by weight of fat.

Additives which are used in conventional meat emulsion products may be mixed with the meat material prior to or after emulsification and included in the meat emulsion of the present disclosure. These additives include salt, spices, seasoning, sugar, and the like in amounts sufficient to provide the product with desired taste characteristics. In addition, minor amounts of other dry ingredients such as, for example, vitamins, minerals, flavors, and the like, may also be added to the meat emulsion.

One or more dry proteinaceous materials can be added to the meat emulsion. In an embodiment, the dry proteinaceous materials can be added to the meat material after the meat material has been emulsified in a first step. The emulsified meat materials comprising the added dry proteinaceous materials can subsequently be further mixed and subjected to another emulsification step involving high speed blending and shearing forces. It should be appreciated that the dry proteinaceous materials can also be added to the meat materials prior to the first emulsification.

The dry proteinaceous materials may comprise, for example, wheat gluten, soy flour, soy protein concentrate, soy protein isolate, egg albumin, and nonfat dry milk to improve emulsion stability and binding, impart flavor, and reduce formulation costs. The inclusion of the dry proteinaceous materials in the meat emulsion is particularly advantageous in the production of product intended for use as a pet food. Dry proteinaceous material enables the processor to use meat materials having a protein to fat ratio and myosin to total protein ratio which would otherwise be of marginal acceptability for use in preparing meat emulsion products. If a dry proteinaceous material is included in the meat emulsion, the amount used may vary from about 5% to about 35% by weight of the emulsion, depending on such factors as the intended use of the product, the quality of meat material used in the emulsion, ingredient cost considerations, and the like. In a preferred embodiment, the level of dry proteinaceous material is between approximately 25 to about 35% by weight. Generally, as the fat content and/or moisture content of the meat material used are increased, the level of dry proteinaceous material in the emulsion is increased accordingly.

While the formulation of the meat emulsion may vary widely, the emulsion, including the dry proteinaceous material, should have a protein to fat ratio sufficient to form a firm meat emulsion product upon coagulation of the protein with no sign of emulsion instability, and the protein content of the emulsion must be such as will enable the emulsion, upon being heated to a temperature above the boiling point of water, to coagulate and form a firm emulsion product within a short period of time, that is, within about 5 minutes, and, preferably within 3 minutes, after being heated to such a temperature. Thus, the meat materials and the additives, including the dry proteinaceous material (if used) are mixed together in proportions such that the meat material is present in an amount of between about 50% to 75% by weight, and preferably from about 60% to about 70% by weight of the meat emulsion. In a preferred embodiment, the starting ingredients for the meat emulsion comprise approximately 29 to about 31% by weight protein and approximately 4 to about 9% by weight fat. The resultant meat emulsion product should have a substantially similar profile to that of the starting ingredients; however, if gravy or broth is added to the product, this profile could change due to the moisture, protein and/or fat content of the gravy/broth.

In addition, the meat emulsion should be formulated to contain between about 45% to about 80% by weight moisture, with the moisture content preferably being controlled between about 49% to about 56% by weight of the meat emulsion, i.e., the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be prebroken or cut into pieces in order to reduce the size of the pieces going into the grinder. While the size of the pieces will depend on the size of the meat grinder intake, normally the frozen meat material is cut into pieces about 10 cm square.

After grinding, the mix of meat particles is conveyed to a mixing tank in which the meat is mixed until uniform, it preferably is heated to a temperature of between about −1° C. to about 7° C., such as by hot water jacketing, steam injection, and the like to facilitate pumping of the meat mix.

The uniform mix of ground meat particles is then comminuted under conditions which emulsify the meat material and form a meat emulsion in which the protein and water of the meat mixture form a matrix that encapsulates the fat globules (e.g. emulsification step). The meat material may be emulsified by any conventional procedure and equipment commonly used in meat emulsification such as by using a mixer, blender, grinder, silent cutter chopper, emulsion mill, and the like which is capable of breaking up and dispersing the fat as globules in the protein slurry to form an emulsion.

Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. in order to minimize protein denaturing at this stage of the process. According to a preferred embodiment of the disclosure, the meat material is passed through an emulsion mill to emulsify the meat material with the emulsion being heated to a temperature between about 10° C. to about 49° C., preferably between about 21° C. to about 38° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Because the addition of the dry proteinaceous material increases the viscosity of the emulsion, better emulsification is obtained when the meat mix is emulsified before the addition of the dry proteinaceous material, which results in the formation of a viscous meat emulsion.

The meat emulsion is again comminuted to increase the fineness of the emulsion (e.g. second emulsification step) and is rapidly heated to a temperature above the boiling point of water, at which temperature the coagulation of protein in the emulsion proceeds so rapidly that the emulsion is set and a firm emulsion product formed within a very short period of time, e.g., 20 seconds or less.

It has been found that rapidly heating the viscous meat emulsion to a temperature above the boiling point of water, and generally between about 120° C. to about 165° C., and more preferably between about 132° C. to about 154° C., will result in the protein in the emulsion coagulating to set the emulsion and form a firm emulsion product within about 5 minutes and typically from a few seconds to about 3 minutes after heating. At this stage in the process, the emulsion is under a pressure of approximately 40 to about 500 psi and preferably 60 to 350 psi. The high temperature, along with increased pressures will provide fiber definition to the product. It has been surprisingly found that the higher the product temperature and pressure the better the fiber development (linear alignment with smaller long fibers).

Preferably, the emulsion is processed in equipment wherein the emulsion is heated to such elevated temperatures while it is being comminuted such as by mechanical heating and/or steam injection. According to a preferred embodiment, the viscous meat emulsion, which is at a temperature of between about 30° C. to about 40° C., is pumped through an emulsion mill in which the meat emulsion is subjected to shearing to increase the fineness of the emulsion and almost simultaneously heat the emulsion to between about 120° C. to about 165° C., preferably 132° C. to about 154° C., through rapid mechanical heating and/or steam injection. Thus, the emulsion preferably is heated to such elevated temperatures in a period of less than about 60 seconds. When the emulsion has been heated to such an elevated temperature in this manner, further significant shearing and cutting of the emulsion should be avoided. Control of the emulsion temperature within the desired range can be effected by adjusting such factors as the feed rate into the emulsion mill, the rotational speed of the emulsion mill, and the like, and can readily be determined by those skilled in the art.

The hot meat emulsion, which is at a temperature above the boiling point of water and generally in the range of between about 120° C. to about 165° C., preferably about 132° C. to about 154° C., is transferred with a positive displacement pump, e.g., a gear or lobe pump, to a holding tube that defines a confined processing zone (e.g. heat exchanging step). In an embodiment, the product is pumped at high pressures of at least about 80 psi or higher. For example, the product can generally be pumped at pressures of about 80 psi to about 600 psi, preferably about 100 psi to about 500 psi, and most preferably 140 psi to about 350 psi into the processing zone. The product can also be pumped at pressures higher than 600 psi using suitable equipment.

At such high pressures, the process operates basically at the emulsifiers upper pressure design limit (235 psi max). For this reason, preferably a gear pump (pressure limit of 500 to beyond 2500 psi.) is close-coupled directly after the emulsifier. This allows the use of the emulsifier to develop the high temperature without the high pressure. The pressure will be developed after the pump. This thereby reduces the pressures in the emulsifier housing to 60 to 100 psi.

In the embodiment illustrated in FIG. 3, the confined processing zone preferably is in the form of an elongated tube, heat exchanger or similar device where flashing of the product moisture can be controlled. The emulsion is retained in the confined processing zone at a pressure above the vapor pressure of the emulsion until the protein in the meat emulsion has coagulated sufficiently to set the emulsion and form a firm emulsion product, which retains its shape and structure when discharged from the confined processing zone. At such elevated temperature, protein coagulation proceeds at a very rapid rate.

While the period of time required for the hot emulsion to set sufficiently to form a firm product will depend on a number of factors, such as the temperature to which the emulsion is heated and the amount and type of protein in the emulsion, a residence time of between a few seconds to about 3 minutes, and usually between about 1 to about 1.5 minutes, in the elongated tube is generally sufficient for the protein to sufficiently coagulate and form a firm emulsion product which will retain its shape, integrity, and physical characteristics. The residence time in the elongated tube can be controlled by adjusting the flow rate of the emulsion to the elongated tube and/or by adjusting the length of the elongated tube.

The structure of the elongated tube can help to create the fiber structure of the product. In an embodiment, the elongated tube can have a reduced cross-sectional diameter along its length such that the circumference of the tube is smaller as the product proceeds into the tube. In practice, tubes having a length of between about 2.5 m and about 8.0 m and preferably 3.0 m to 6.0 m and an internal diameter of between about 12 mm and about 75 mm are believed to function satisfactorily to form a firm emulsion product. Because the tube has a cross-sectional diameter that decreases along its length, or a portion thereof, the product, as it enters the tube, is squeezed as it flows through the tube. The flow rate and differing pressures on the product help create the fiber structure. By way of example, a tube material is used having a diameter of approximately 62 mm at the opening where the product enters the tube and narrows through a conical reducer to a 25 mm diameter. Tubes of various cross-sectional shapes may be used, such as circular, square, rectangular, and the like as long as a reduction in the diameter is provided.

Preferably, the tube is cooled. This allows the product to be cooled as it is forced through the tube. Typically the tube can be cooled by an external jacket or other means. A rectangular or similar shaped tube may provide a preferred design so as to afford a structure that can be externally cooled and allows the product contained in the center of the tube to be sufficiently cooled.

The set meat emulsion pieces discharged from the confined processing zone are in the form of long strips of products having a temperature of about 65° C. to 100° C., and a moisture content of about 47% to 65%, with the pieces varying in size. Upon discharge from the processing zone, the pieces are rapidly cooled by evaporating cooling to a temperature in the range of 60° C. to 93° C. If desired, suitable cutting means, such as a rotary cut-off knife, a water jet knife, a knife grid, or the like may be mounted at the discharge end of the elongated tube to cut the product into pieces of a desired size, e.g. from about 150 mm to about 350 mm. If desired, the product may be cut down the center to allow the product to more rapidly cool. The meat emulsion chunks thus formed have excellent integrity and strength and will retain their shape and fiber characteristics when subjected to commercial canning and retorting procedures such as those required in the production of canned foods having a high moisture content.

To enhance the fibrous image of the product, a set of compression rolls which consists of two long lightly-toothed cylinders (rolls) that spin at similar speeds can be used. Product that is discharged from the confined processing zone is dropped into a narrow adjustable opening between the spinning cylinders which open up/partially separate/tear the fibers. It has been found that this incomplete shredding functions to emphasize the linear fibers.

The discharged meat emulsion pieces can be subjected to a number of post-discharge steps. For example, the meat emulsion pieces discharged from the confined processing zone may be conveyed to a dryer to remove a large portion of the moisture therefrom, and the dried product collected and stored. Moisture reduction may also be accomplished by exposing the pieces to dry heat, so that the resultant product pieces, although displaying fibers, have a generally kibble-like appearance. The dry heat may be provided by roasting, baking, grilling or frying the body. Preferably, the body is flash-fried. The duration would typically be less than one minute and preferably in the range from 15-35 seconds when the oil is in the temperature range from 150° C. to 200° C.

Alternatively, the meat emulsion pieces may be conveyed from the elongated tube directly to a canning operation in which chunks are filled into cans together with other ingredients, such as sauce, gravy, and the like, and the cans retorted. In either situation, the product can be resized if desired.

By way of example, in the production of a canned pet food product, a suitable gravy may be prepared by heating a mixture of water, starch, and condiments. The meat emulsion chunks and gravy are filled into cans in the desired proportions, the cans are vacuum sealed and are then retorted under time-temperature conditions sufficient to effect commercial sterilization. Convention retorting procedures may be used. Typically, a retorting temperature of about 118° C. to 121° C. for approximately 40 to 90 minutes is satisfactory in producing a commercially sterile product.

In alternative embodiments, the present disclosure provides meat emulsion products comprising a plurality of different colors and/or textures. For example, the meat emulsion can comprise a body defined by a plurality of fibrous structures and a plurality of colors. The body can comprise at least about 29% protein by weight and less than about 9% fat by weight. The plurality of colors gives the outer surface of the meat emulsion an appearance such as, for example, swirling, marbling, shading or combinations thereof of different colors. The colors can be derived from any suitable coloring agents such as, for example, caramel, FD&C (Food, Drugs & Cosmetics) certified colors, titanium dioxide, iron oxides, annatto, turmeric, natural colors, artificial colors or combinations thereof.

In another embodiment, the present disclosure provides a meat emulsion product comprising protein, fat and a plurality of distinct textures. For example, one or more of the textures comprises a plurality of fiber structures integrally formed therewith affording the meat emulsion product a realistic meat-like appearance. To provide the plurality of distinct textures, the meat emulsion product comprises one or more suitable texturizing ingredients. The texturing ingredients can be, for example, wheat gluten, wheat flour, egg white, sulfur compounds, cystine, gums (e.g. xanthan, algin), soy proteins (e.g. soy protein concentrates and fractions) and combinations thereof.

In an alternative embodiment, the present disclosure provides a meat emulsion product comprising a body defined by a plurality of linear strands of fibrous material and a plurality of axial strands of fibrous material that afford the meat emulsion product a realistic meat-like appearance.

In embodiments illustrated in FIGS. 4-9, the present disclosure provides alternative methods for producing a meat emulsion product having a plurality of distinct colors and/or textures. In an embodiment illustrated in FIG. 4, the present disclosure provides modifying the method discussed previously (and illustrated in FIG. 3) to make a meat emulsion comprising a plurality of colors. For example, the method comprises forming a first meat emulsion comprising a protein, a fat and a first color and forming a second meat emulsion comprising a protein, a fat and a second color. After the emulsification steps are complete for each product stream, the first meat emulsion is mixed with the second meat emulsion. The mixture can be sufficiently blended at a rate and duration (e.g. using a static mixer) so that the first meat emulsion and second meat emulsion form a single emulsion yet at least two or more colors are apparent from the surface of the mixture.

Figure 4:
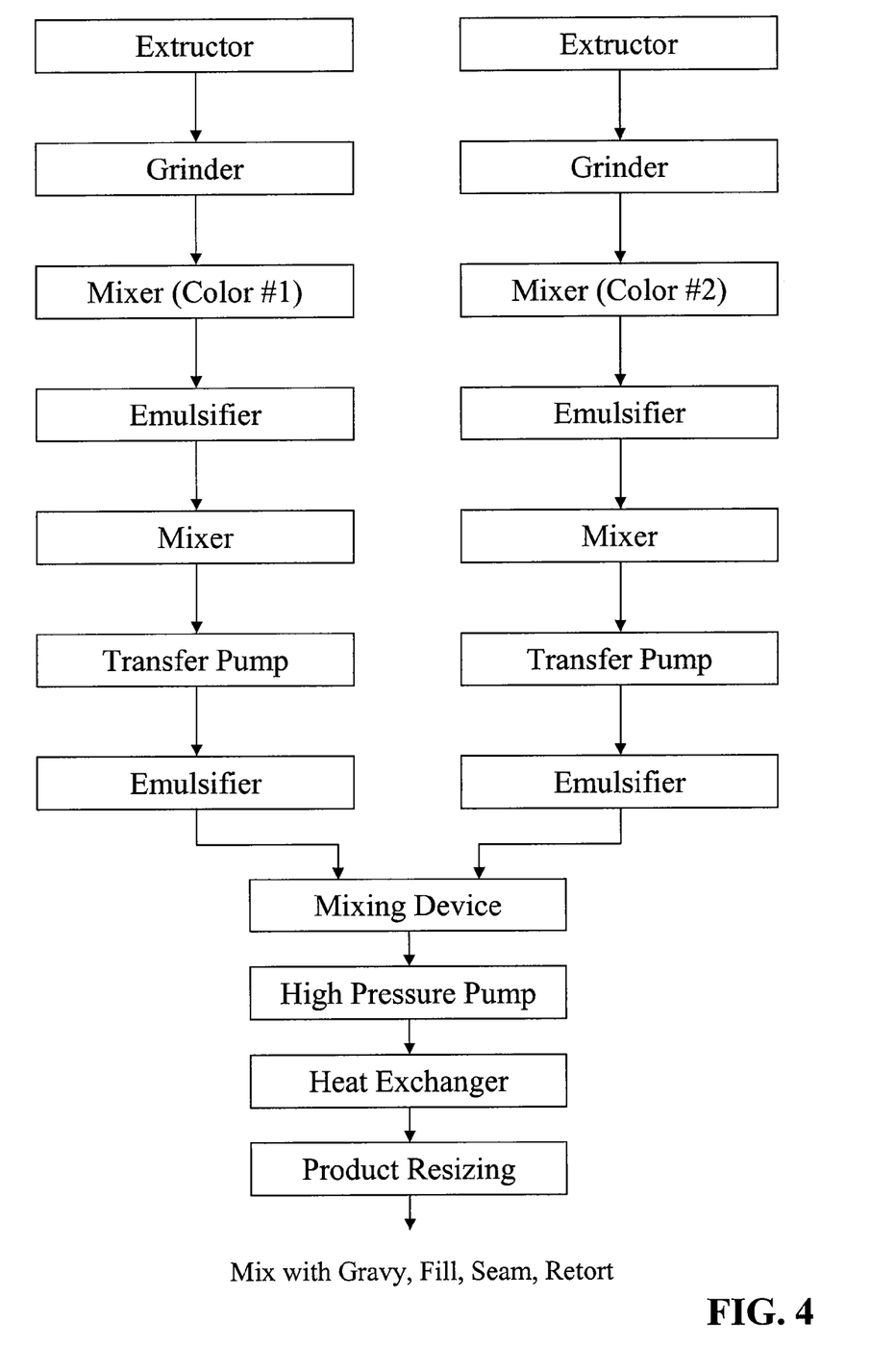
FIG. 4 is a schematic of a process for manufacturing meat emulsion products in a second embodiment of the present disclosure.

The mixed meat emulsion is heated (e.g. to a temperature of about 100° C. to about 165° C.) and then subjected to a pressure of about 80 psi to about 600 psi, preferably about 100 psi to about 500 psi, and most preferably 140 psi to about 350 psi in the processing zone. In a subsequent heat exchanging step, the temperature of the mixed meat emulsion coming from the high pressure pump is substantially reduced (e.g. a decrease of about 20° C. to about 40° C.) in a short amount of time in a heat exchanging device or chamber.

The temperature of the meat emulsion prior to or during the high pressurization can range from about 100° C. to about 165° C. and preferably from about 120° C. to about 140° C. The initial temperature right before the heat exchanging step can be controlled depending on the shape and degree of structural fibers that are desired in the final product. The temperature of the mixed meat emulsion can be lowered from about 120° C. to about 165° C. coming from the high pressure pump to about 80° C. to about 125° C. in a period of a few seconds to 10 minutes (preferably from about 1 to about 3 minutes) depending on the degree of structural fiber formation that is desired. The pressurized meat emulsion is discharged to form the meat emulsion product and can be subjected to various post-discharge steps as discussed above.

Figure 5:
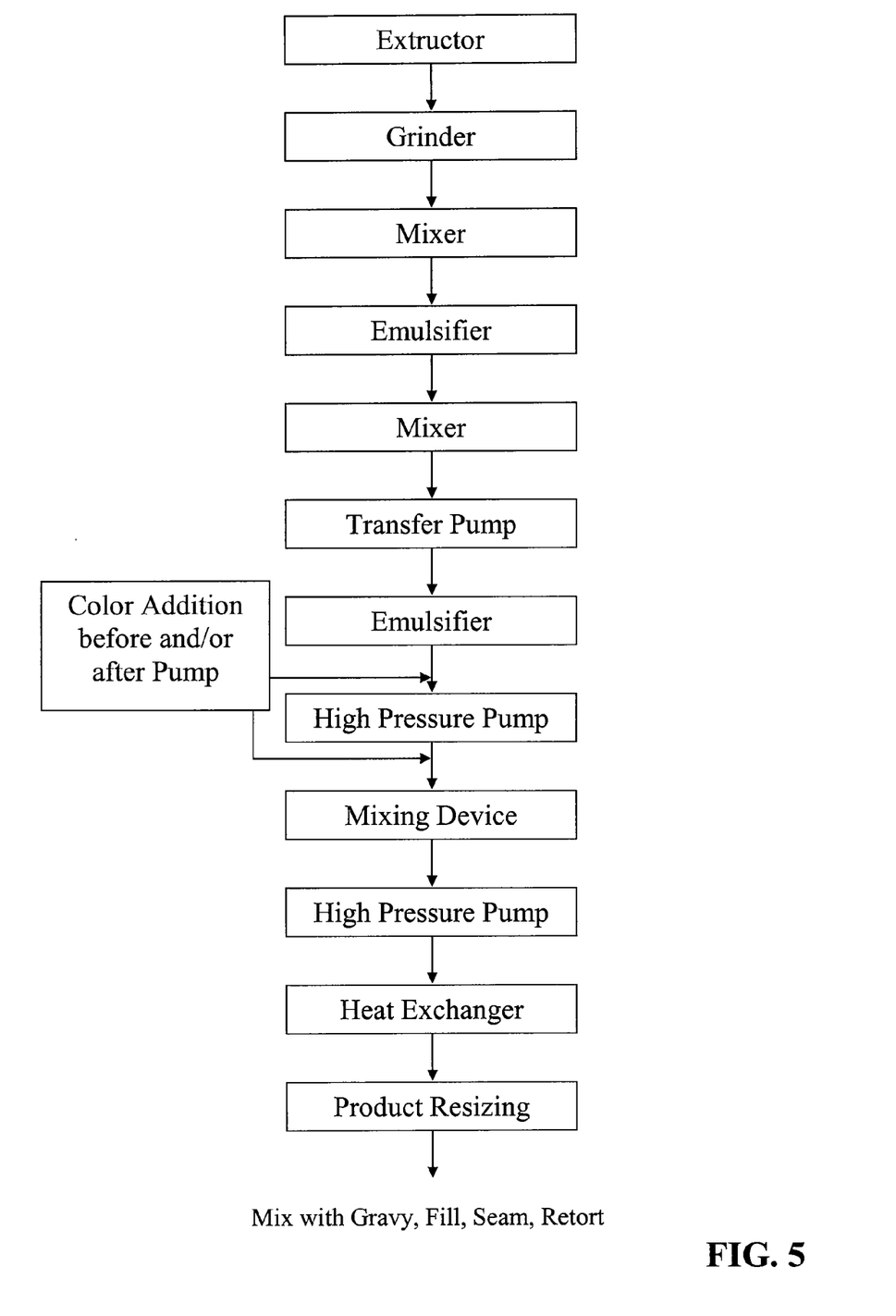
FIG. 5 is a schematic of a process for manufacturing meat emulsion products in a third embodiment of the present disclosure.

In an alternative embodiment illustrated in FIG. 5, the present disclosure provides a method comprising forming a meat emulsion comprising a protein, a fat and a first color. The meat emulsion is comminuted and heated, for example, to a temperature of about 100° C. to about 165° C. One or more colors are added to the meat emulsion and mixed with the meat emulsion. For example, the color(s) can be added before and/or after the first high pressure pump step.

The meat emulsion containing the added color(s) can be sufficiently blended at a rate and duration (e.g. using a static mixer) so that at least two or more colors are apparent from the surface of the meat emulsion. The meat emulsion is heated and subjected to a pressure of at least about 80 psi. The pressurized meat emulsion is passed through a heat exchanger to lower the temperature of the meat emulsion to form the meat emulsion product. The pressurized meat emulsion is discharged to form the meat emulsion product and can be subjected to various post-discharge steps.

Figure 6:
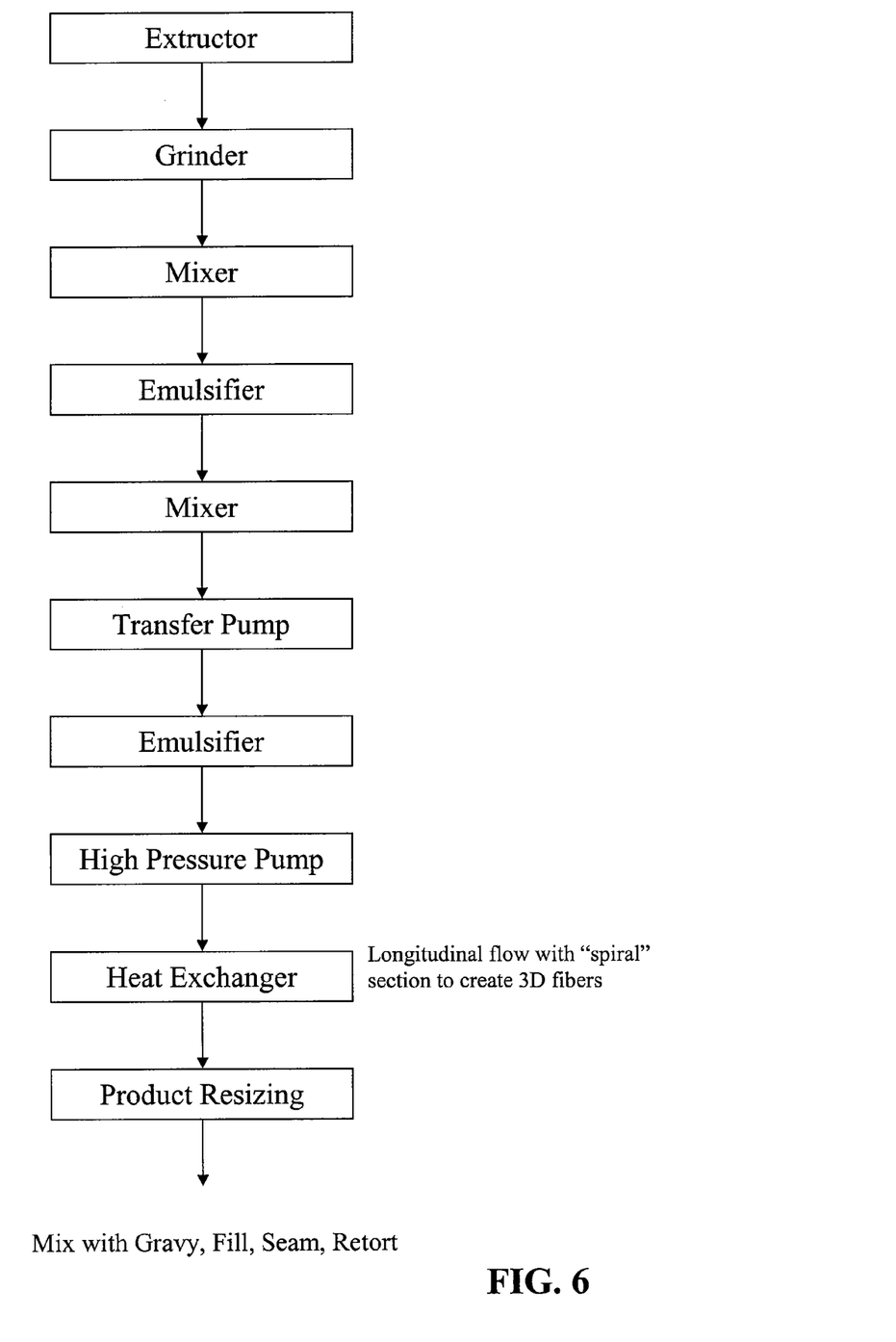
FIG. 6 is a schematic of a process for manufacturing meat emulsion products in a fourth embodiment of the present disclosure.

In yet another embodiment illustrated in FIG. 6, the present disclosure provides a method comprising forming a meat emulsion comprising a protein and a fat and comminuting and heating the meat emulsion, for example, to a temperature of about 100° C. to about 165° C. The meat emulsion is heated and subjected to a pressure of at least about 80 psi. The meat emulsion is then subjected to a longitudinal spiraling flow (e.g. before, during or after a heat exchanging process). The spiraling flow can be analogous to a rifling of a gun barrel. The configuration of the meat emulsion flow is such that while moving down the tube in a linear fashion, the meat emulsion also spirals for a period of time such that the 3-D axial fibers form along with the liner fibers to create an appearance similar to a cooked fish texture. The meat emulsion is finally discharged to form the meat emulsion product and can be subjected to various post-discharge steps.

Figure 7:
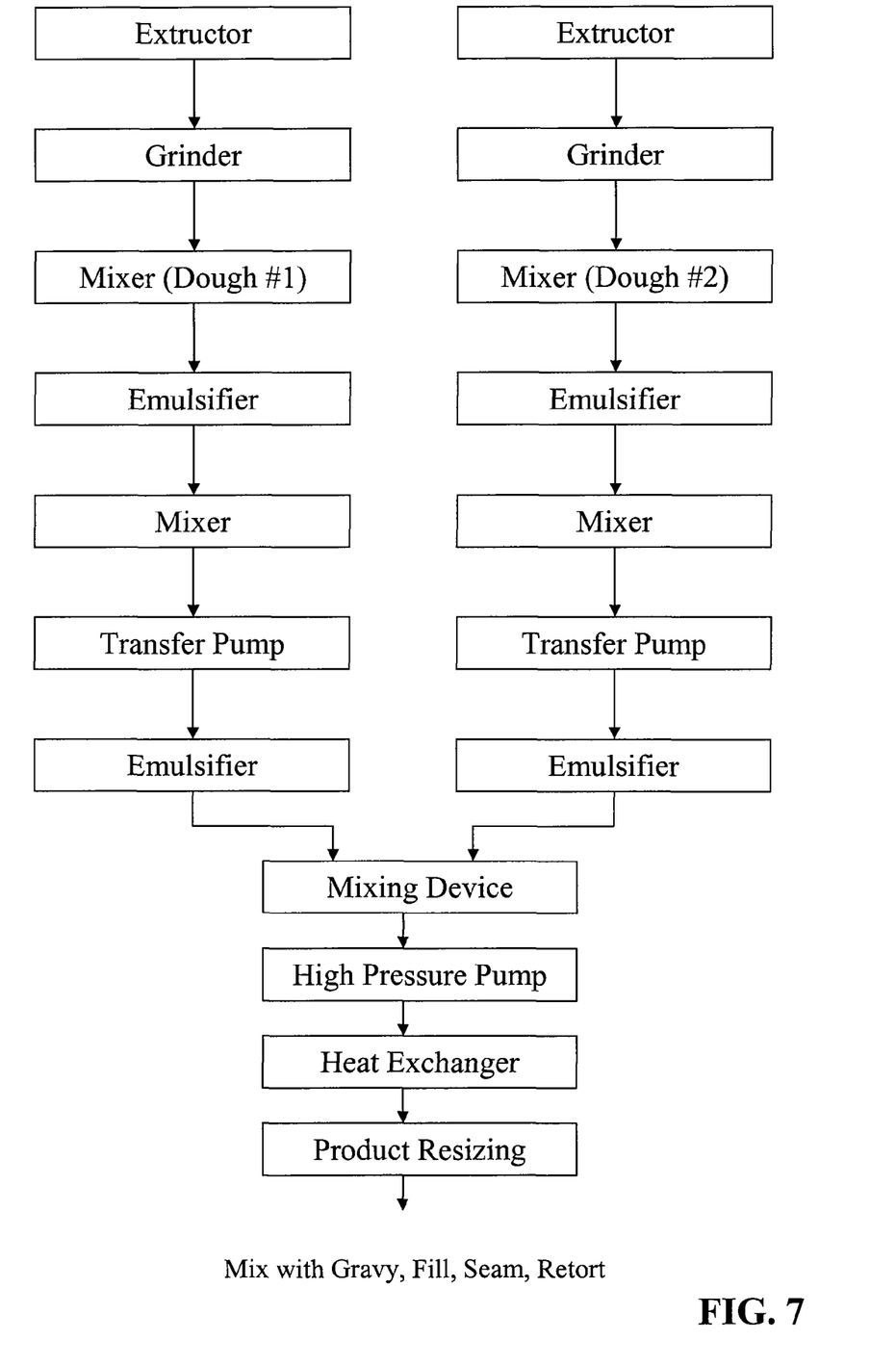
FIG. 7 is a schematic of a process for manufacturing meat emulsion products in a fifth embodiment of the present disclosure.

In an alternative embodiment illustrated in FIG. 7, the present disclosure provides a method comprising forming a first meat emulsion comprising a protein, a fat and first texturizing ingredient and forming a second meat emulsion comprising a protein, a fat and a second texturizing ingredient. The first meat emulsion is mixed with the second meat emulsion. The mixed meat emulsion is heated and subjected to a pressure of at least about 80 psi. The pressurized meat emulsion is passed through a heat exchanger to lower the temperature of the meat emulsion to form the meat emulsion product having a plurality of textures. The pressurized meat emulsion is discharged to form the meat emulsion product and can be subjected to various post-discharge steps.

Figure 8:
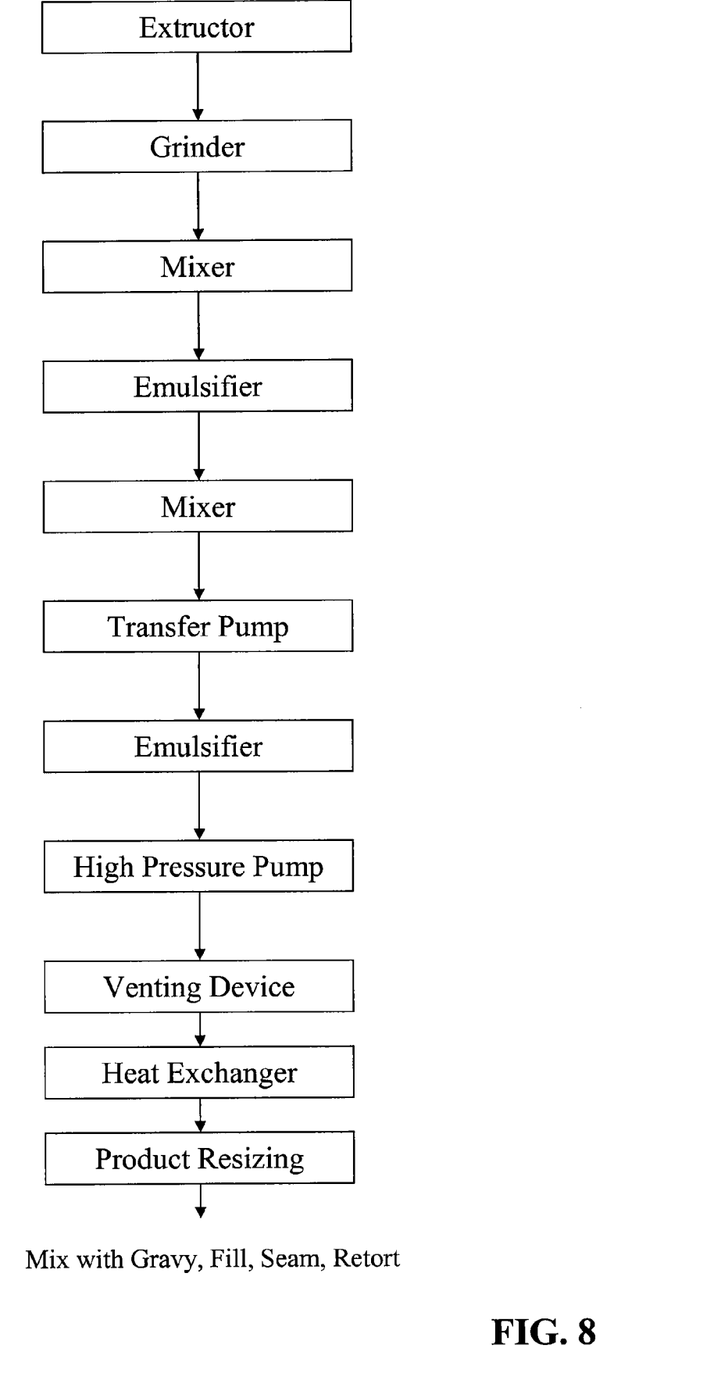
FIG. 8 is a schematic of a process for manufacturing meat emulsion products in a sixth embodiment of the present disclosure.

In still another embodiment illustrated in FIG. 8, the present disclosure provides a method comprising forming a meat emulsion comprising a protein and a fat and comminuting and heating the meat emulsion, for example, to a temperature of about 100° C. to about 165° C. The meat emulsion is subjected to a pressure of at least about 80 psi and placed in a heat exchanging device where the meat emulsion is vented/flashed, for example, to release steam/moisture from the meat emulsion. The meat emulsion can be vented for any suitable amount of time to achieve a designed appearance on the meat emulsion. The meat emulsion is discharged to form the meat emulsion product and can be subjected to various post-discharge steps.

In the venting/flashing step, the temperature of the mixed meat emulsion coming from the high pressure pump is substantially reduced (e.g. a decrease of about 20° C. to about 40° C.) in a short amount of time by allowing moisture/steam to be released from the meat emulsion in a heat exchanging device or chamber. The extent of temperature change and amount of release of the moisture/steam from the meat emulsion resulting from the change in temperature will effect the amount and degree of fiber definition in the finished product. For example, at a higher initial temperature (e.g. from about 140° C. to about 165° C.), the resulting fibers are more random in shape and appearance. At a lower initial temperature (e.g. from about 100° C. to about 120° C.), the resulting fibers appear denser (e.g. like string cheese).

Figure 9:
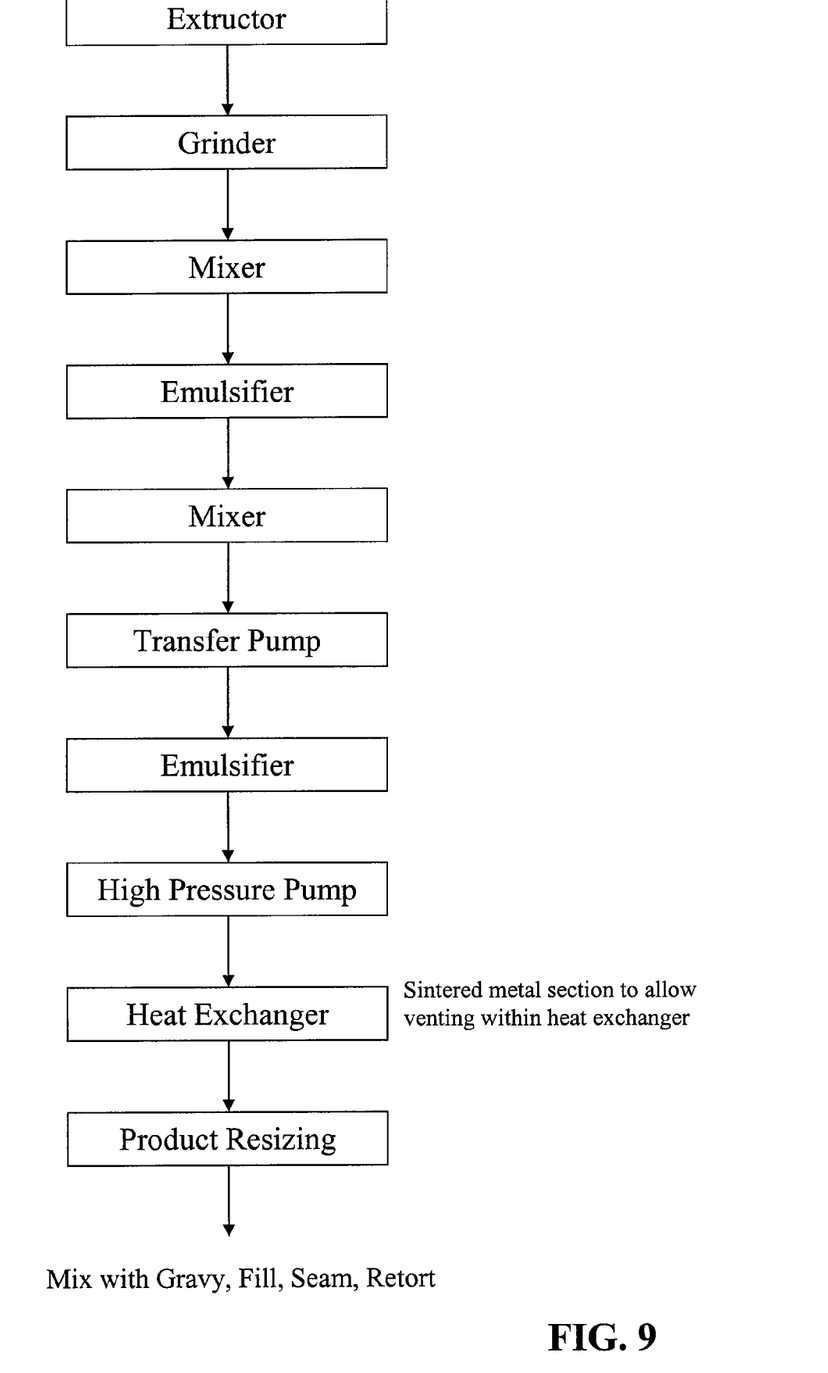
FIG. 9 is a schematic of a process for manufacturing meat emulsion products in a seventh embodiment of the present disclosure.

In an alternative embodiment illustrated in FIG. 9, the present disclosure provides method comprising forming a first meat emulsion comprising a protein, a fat and a first color. The meat emulsion is then comminuted and heated the meat emulsion, for example, to a temperature of about 100° C. to about 165° C. The meat emulsion is subjected to a pressure of at least about 80 psi and passed through a sintered chamber. For example, the sintered chamber can comprise sintered materials (e.g. porous or sponge-like materials) such as metal, ceramic, alloy or other engineered materials that are part of the actual chamber. The sintered chamber can be used as a heat exchanger for controlled release of the steam without flashing as the meat emulsion is subjected to cooling thereby creating a meat emulsion product having a unique texture. The pressurized meat emulsion is discharged to form the meat emulsion product and can be subjected to various post-discharge steps.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A meat emulsion product comprising a body comprising a mixed first meat emulsion and second meat emulsion, the body defined by a plurality of fibrous structures and a plurality of distinct colors.

2. The meat emulsion product of claim 1, wherein the plurality of colors gives the outer surface of the meat emulsion an appearance selected from the group consisting of swirling, marbling, shading and combinations thereof.

3. The meat emulsion product of claim 1, wherein the colors are derived from a coloring agent selected from the group consisting of caramel, FD&C certified colors, titanium dioxide, iron oxides, annatto, turmeric, natural colors, artificial colors and combinations thereof.

4. The meat emulsion product of claim 1, wherein the body comprises at least about 29% protein by weight and less than about 9% fat by weight.

5. The meat emulsion product of claim 1, wherein the protein is selected from the group consisting of poultry, beef, pork, fish and combinations thereof.

6. The meat emulsion product of claim 1 comprising at least one proteinaceous material.

7. The meat emulsion product of claim 6, wherein the proteinaceous material comprises approximately 25% to about 55% by weight of the product.

8. A meat emulsion product comprising a mixed first meat emulsion and second meat emulsion, protein, fat and a plurality of distinct textures, wherein at least one of the textures comprises a plurality of fiber structures integrally formed therewith affording the meat emulsion product a realistic meat-like appearance.

9. The meat emulsion product of claim 8 comprising a texturizing ingredient selected from the group consisting of wheat gluten, wheat flour, egg white, sulfur compounds, cystine, gums, soy proteins and combinations thereof.

10. The meat emulsion product of claim 8, wherein the protein comprises approximately 29% to about 31% by weight of the meat emulsion product.

11. The meat emulsion product of claim 8, wherein the fat comprises approximately 4% to about 9% by weight of the meat emulsion product.

12. The meat emulsion product of claim 8, wherein the meat emulsion product comprises approximately 52% to about 56% by weight moisture.

13. A meat emulsion product comprising a body defined by a plurality of linear strands of fibrous material and a plurality of axial strands of fibrous material that afford the meat emulsion product a realistic meat-like appearance.

14. A method for producing a meat emulsion product, the method comprising
forming a first meat emulsion comprising a protein, a fat and a first color;
forming a second meat emulsion comprising a protein, a fat and a second color;
mixing the first meat emulsion with the second meat emulsion;
heating the mixed meat emulsion;
subjecting the mixed meat emulsion to a pressure of at least about 80 psi.; and
passing the meat emulsion through a heat exchanger to lower the temperature of the meat emulsion.

15. A method for producing meat emulsion products, the method comprising
forming a meat emulsion comprising a protein, a fat and a first color;
comminuting and heating the meat emulsion;
adding a second color to the meat emulsion;
subjecting the meat emulsion to a pressure of at least about 80 psi; and
passing the meat emulsion through a heat exchanger to lower the temperature of the meat emulsion.

16. A method for producing meat emulsion products, the method comprising
forming a meat emulsion comprising a protein and a fat;
comminuting and heating the meat emulsion;
subjecting the meat emulsion to a pressure of at least about 80 psi;
subjecting the meat emulsion to a longitudinal spiraling flow; and
lowering the temperature of the meat emulsion.

17. A method for producing a meat emulsion product, the method comprising
forming a first meat emulsion comprising a protein, a fat and first texturizing ingredient;
forming a second meat emulsion comprising a protein, a fat and a second texturizing ingredient;
mixing the first meat emulsion with the second meat emulsion;
heating the mixed meat emulsion;
subjecting the mixed meat emulsion to a pressure of at least about 80 psi; and
passing the mixed meat emulsion through a heat exchanger to lower the temperature of the mixed meat emulsion.

18. The method of claim 17, wherein the texturizing ingredients are selected from the group consisting of wheat gluten, wheat flour, egg white, sulfur compounds, cystine, gums, soy proteins and combinations thereof.

19. A method for producing meat emulsion products, the method comprising
forming a first meat emulsion comprising a protein and a fat;
forming a second meat emulsion comprising a protein and a fat;
mixing the first meat emulsion with the second meat emulsion;
comminuting and heating the mixed meat emulsion;
subjecting the mixed meat emulsion to a pressure of at least about 80 psi;
venting the mixed meat emulsion; and
discharging the mixed meat emulsion.

20. A method for producing meat emulsion products, the method comprising
forming a first meat emulsion comprising a protein, a fat and a first color;

forming a second meat emulsion comprising a protein, a fat and a second color;

mixing the first meat emulsion with the second meat emulsion;

comminuting and heating the mixed meat emulsion to a temperature of about 120° C. to about 165° C.;

subjecting the mixed meat emulsion to a pressure of at least about 80 psi;

passing the mixed meat emulsion through a sintered chamber; and discharging the mixed meat emulsion.

21. The method of claim 20, wherein the sintered chamber comprises a porous material selected from the group consisting of metal, ceramic, alloy and combinations thereof.

* * * * *